(12) United States Patent
Gilreath et al.

(10) Patent No.: US 10,722,095 B1
(45) Date of Patent: *Jul. 28, 2020

(54) WATER CONSERVING CLEANING SYSTEM, APPARATUS AND METHOD

(71) Applicants: Chris Gilreath, Rogers, AR (US); Thomas B. Pedersen, Fayetteville, AR (US)

(72) Inventors: Chris Gilreath, Rogers, AR (US); Thomas B. Pedersen, Fayetteville, AR (US)

(*) Notice: Subject to any disclaimer, the term of this patent is extended or adjusted under 35 U.S.C. 154(b) by 0 days.

This patent is subject to a terminal disclaimer.

(21) Appl. No.: 16/418,300

(22) Filed: May 21, 2019

Related U.S. Application Data

(63) Continuation-in-part of application No. 15/727,983, filed on Oct. 9, 2017, now Pat. No. 10,335,008, which is a continuation-in-part of application No. 14/561,218, filed on Dec. 5, 2014, now Pat. No. 9,782,053.

(60) Provisional application No. 61/912,482, filed on Dec. 5, 2013.

(51) Int. Cl.
*A47L 15/42* (2006.01)
*A47L 15/00* (2006.01)
*A47L 15/08* (2006.01)

(52) U.S. Cl.
CPC ....... *A47L 15/0047* (2013.01); *A47L 15/0005* (2013.01); *A47L 15/0015* (2013.01); *A47L 15/08* (2013.01); *A47L 15/424* (2013.01); *A47L 15/4242* (2013.01); *A47L 2401/09* (2013.01); *A47L 2401/10* (2013.01); *A47L 2401/14* (2013.01); *A47L 2501/05* (2013.01)

(58) Field of Classification Search
None
See application file for complete search history.

(56) References Cited

U.S. PATENT DOCUMENTS

| | | | |
|---|---|---|---|
| 5,787,537 A | 8/1998 | Mannillo | 8/158 |
| 5,971,303 A | 10/1999 | Pugh-Gottlieb | 241/46.013 |
| 6,182,305 B1 | 2/2001 | O'Connell et al. | 4/631 |
| 6,248,982 B1 | 6/2001 | Reid et al. | 219/429 |
| 7,240,379 B2 | 7/2007 | Switzer | 4/625 |
| 7,481,231 B2 | 1/2009 | Litterst et al. | 134/60 |
| 7,935,194 B2 | 5/2011 | Rolek | 134/56 |

(Continued)

*Primary Examiner* — Cristi J Tate-Sims
(74) *Attorney, Agent, or Firm* — Keisling & Pieper PLC; Daniel B. Pieper

(57) ABSTRACT

The present disclosure is directed to an apparatus for rinsing and disinfecting utensils, on demand, with a controller operating the components that deliver a pre-determined volume or timed flow of water, and exposure time of sanitizer(s) to the intended objects. The spray embodiment has high performance conical spray nozzle(s) controlled by a controller that reduces water usage and that may vary depending on the viscosity of the material to be eliminated. The recirculating embodiment has a recirculating water system, with a controller operating the components that recirculate water throughout the system until the turbidity exceeds a chosen threshold, and displace with fresh water until the turbidity returns to a lower threshold. The water resumes recirculation until it again exceeds the chose turbidity threshold and the water in the system is again displaced by fresh water. Both spray and recirculating embodiments can contain multiple rinse stations.

13 Claims, 18 Drawing Sheets

(56) References Cited

U.S. PATENT DOCUMENTS

| | | |
|---|---|---|
| 9,782,053 B2 | 10/2017 | Gilreath et al. |
| 2006/0213543 A1 | 9/2006 | Litterst et al. ............. 134/103.2 |
| 2010/0139713 A1 | 6/2010 | Averbeck et al. ......... 134/103.1 |
| 2010/0320155 A1 | 12/2010 | Enos et al. .................... 210/717 |
| 2013/0092188 A1 | 4/2013 | Balinski et al. ................ 134/10 |
| 2013/0105461 A1 | 5/2013 | Huegerich et al. ........... 219/438 |
| 2013/0174871 A1 | 7/2013 | Thiyagarajan .................. 134/18 |
| 2013/0319458 A1* | 12/2013 | Lim .................... A47L 15/0039 134/1 |
| 2014/0318585 A1* | 10/2014 | Kim .................... A47L 15/4214 134/113 |

* cited by examiner

Persistence of E. coli inoculated with DTW on scoop after 2 hours continuous use.[1]

| Time(s) | Log10 CFU/ml (SD) by Treatment[2] | |
| --- | --- | --- |
| | Rinse Only | Rinse + UV-C |
| 5 | 2.84 (0.01) | 1.21 (0.062) |
| 10 | 0.72 (0.085) | 0.18 (0.21) |
| 30 | 0 | 0 |

[1] All treatment and time combinations are statistically significantly different ($p < 0.05$).

[2] Starting concentration of $6.36_{log10}$ CFU/ml.

SD= standard deviation

*FIG.14*

Persistence of *E. coli* inoculated in 10%SM on scoop after 2 hours continuous use.[1]

| Time(s) | Log10 CFU/ml (SD) by Treatment[2] | |
| --- | --- | --- |
| | Rinse Only | Rinse + UV-C |
| 5 | 3.13 (0.019) | 1.69 (0.026) |
| 10 | 2.99 (0.015) | 1.31 (0.021) |
| 30 | 1.27 (0.05) | 0.91 (0.073) |

[1] All treatment and time combinations are statistically significantly different ($p < 0.05$).

[2] Starting concentration of $6.36_{log10}$ CFU/ml.

SD= standard deviation

| NOTE: Explanation of $log_{10}$ CFU/ml |
| --- |
| 1.00 = 10 CFU, |
| 2.00 = 100 CFU, |
| 3.00 = 1,000 CFU, |
| 4.00 = 10,000 CFU, |
| 5.00 = 100,000 CFU, |
| 6.00 = 1,000,000 CFU |

*FIG.15*

Sampling matrix for evaluation of dipper well combine with sanitizer

|  |  | Sanitizer 1 (UV-C, 254 nm) | Sanitizer 2 (QAC) |
|---|---|---|---|
| Concentration [C] | C1 |  | 200 ppm |
|  | C2 |  | 400 ppm |
| Exposure [E] | E1 | 30 mJ/cm2 (5 sec) | 5 sec |
|  | E2 | 60 mJ/cm2 (10 sec) | 10 sec |
|  | E3 | 180 mJ/cm2 (30 sec) | 30 sec |

*FIG.18*

WATER CONSERVING CLEANING SYSTEM, APPARATUS AND METHOD

CROSS-REFERENCE TO RELATED APPLICATIONS

This application claims priority to and is a continuation-in-part of U.S. patent application Ser. No. 15/727,983, filed on Oct. 9, 2017, which is a continuation-in-part of U.S. patent application Ser. No. 14/561,218, filed on Dec. 5, 2014, which is a continuation-in-part of U.S. Provisional Patent Application Ser. No. 61/912,482, filed on Dec. 5, 2013. Each of these prior applications is incorporated by reference in their entirety.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Field of the Invention

The disclosure pertains to an apparatus for washing, rinsing, sterilizing, and sanitizing utensils or other items, on demand with a controller that operates the components of the apparatus, and that delivers a pre-determined volume or timed flow of water, and timed exposure of sanitizer(s), while monitoring turbidity, recirculating, and/or spraying the water through the apparatus to clean and sanitize the intended objects. This disclosure pertains to an apparatus for washing, rinsing, sterilizing, and sanitizing utensils or other items on demand, augmented by additional sanitization with ozone treatment, and perhaps with chemical disinfectants, and/or UV irradiation, and/or heat.

(2) Background of Invention

Businesses such as coffee houses and ice cream shops make use of dipper wells for rinsing and cleaning utensils and other items, such as spoons, ice cream scoops, and other silverware. These items are cleaned between uses to protect consumers against allergens and bacterial growth. Standard design of such an apparatus usually contains a single spigot with perpetual water flow that is kept running during business hours. Because the water flows constantly, the number of gallons of water used is extremely high. It has been estimated that a dipper well such as this, running 12 hours a day in a single business, could use up to 260,000 gallons of water in a year. The typical expense of water to run one spigot is around $1,000 per year. Most such businesses have anywhere from one to thirteen spigots running in such a manner. This translates into not only a large amount of water used, but a significant portion of it wasted down the drain. For this reason, the dipper well has been criticized as wasteful. Because the potential for water waste is counteracted by a potential for increased sanitation, most health regulations do not prohibit nor mandate dipper wells. An apparatus that is not only more efficient with water conservation, but also more effective at cleaning is desirable.

A way to use less water during the cleaning of utensils is desirable not only to save money, but also to conserve a precious resource, water. A need exists for environmentally sound solutions for water waste in these industries. A need exists to sanitize utensils and other items for the good of the public. A need exists for a more efficient method to sanitize utensils and other items in the food industry. A need exists to protect the health of the people who come in contact with these items after proper sanitization. The present disclosure meets these needs. It could accomplish water conservation in businesses where items need to be cleaned and sanitized, while also protecting the health of the consumer.

Any references mentioned are not admitted to be prior art with respect to the present disclosure.

BRIEF SUMMARY OF THE INVENTION

In general, the present disclosure herein comprises a system that cleans and sanitizes items such as utensils. The present disclosure comprises an apparatus that reduces the amount of water used in the sanitation of utensils. This reduction in the amount of water used translates into a decrease in the amount of water wasted. Therefore, the present disclosure comprises an apparatus that reduces the amount of water wasted. The process of the present disclosure is either recirculating the water used in the system or spraying high velocity water on the utensils during the cleaning process. Both processes translate into not only a more efficient sanitization, but also a more effective one.

A first embodiment includes one or more rinse bays holding the utensils in a wedge shaped basket/cage while they are automatically sprayed with water through a high velocity nozzle, augmented by ozone treatment, perhaps augmented by chemical disinfectants, and/or UV irradiation, and/or heat. An alternate embodiment includes one or more rinse bays filled with soak water that is recycled until its turbidity exceeds a first chosen threshold, whereupon the soak water is replaced by fresh water until the turbidity returns to a lower chosen threshold that is lower than the first threshold. The alternate embodiment holds the utensils in a wedge shaped basket/cage and is augmented by ozone treatment, and perhaps augmented by chemical disinfectants, and/or UV irradiation, and/or heat. For the purpose of this disclosure the first embodiment that involves the high velocity spray nozzles will be referred to as the spray embodiment and the alternate embodiment that involves the recirculation of water will be referred to as the recirculating embodiment. The spray embodiment can be either a round model or an elongated model. The recirculating embodiment can be either a round model or an elongated model.

The present disclosure is directed to an apparatus for rinsing and disinfecting utensils, on demand, with a Programmable Logic Controller or Microcontroller, referred to in this disclosure as a controller, operating the components that deliver a pre-determined volume or timed flow of water, and exposure time of sanitizer(s) to the intended objects. A spray embodiment can have high performance conical spray nozzle(s) controlled by a controller that reduces water usage and that may vary depending on the viscosity of the material to be eliminated. The use of ozone, heat, sanitizers, and/or UV irradiation may be employed to further disinfect the utensils beyond the rinsing. A recirculating embodiment can have a recirculating water system, with a controller operating the components that recirculate water throughout the system until the turbidity exceeds a chosen threshold, and displaced with fresh water until the turbidity returns to a lower threshold. The water resumes recirculation until it again exceeds the chose turbidity threshold and the water in the system is again displaced by fresh water. The use of ozone, heat, sanitizers, and/or UV irradiation may be employed to further disinfect the utensils beyond the rinsing in both embodiments. Both the spray and the recirculating embodiments can contain multiple rinse stations.

The present disclosure is effective in quickly cleaning and sanitizing the utensils. The cost of operation of the present disclosure is less than for traditional dipper wells, without sacrificing speed of service. The user can drop utensils in the dipper well apparatus and walk away to tend to other tasks while the dipper well apparatus goes through the rinse/sanitization cycle. The apparatus in this disclosure could therefore replace current ways of sanitizing utensils in food preparation, coffee shops, ice cream parlors, and other food service establishments where sanitation is important, such as the rinsing of produce in retail, wholesale, and at farmer's markets.

BRIEF DESCRIPTION OF THE DRAWINGS

FIG. 14 shows a table demonstrating the statistical difference of removing *E. coli* with rinse only and rinse+UVC treatment after 2 hours of continuous use of the elongated dipper well.

FIG. 15 shows a table demonstrating the statistical difference of removing *E. coli* from rinse only and rinse+UVC treatment after 2 hours of continuous use of the elongated dipper well on utensils treated with 10% skim milk and *E. coli*.

FIG. 18 shows a sampling matrix for evaluation of an elongated trough-like dipper well combined with sanitizers.

DETAILED DESCRIPTION OF THE PREFERRED EMBODIMENTS

Figure 1:
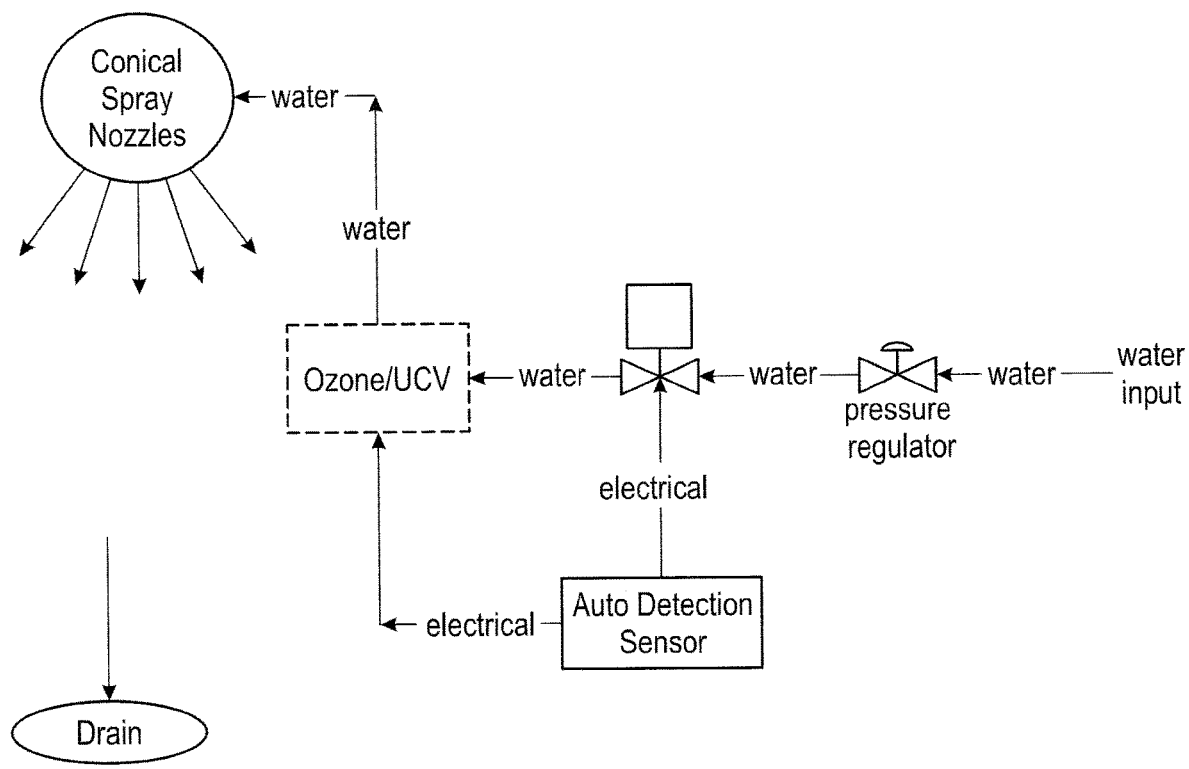
FIG. 1 is a process drawing of a spray embodiment for both round and elongated dipper wells.

The terminology used herein is for the purpose of describing particular embodiments only, and is not intended to be limiting. As used herein, the singular forms "a", "an", and "the" are intended to include the plural forms as well, unless the context clearly indicates otherwise. It will be further understood that the terms "comprises" and/or "comprising" or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

For the sake of simplicity and to give the claims of this disclosure the broadest interpretation and construction possible, the conjunctive "and" may be taken to include the disjunctive "or," and vice versa, whenever necessary to give the claims of this disclosure the broadest interpretation and construction possible the disjunctive "or" may be taken to include the conjunctive "and." Likewise, when the plural form is used, it may be taken to include the singular form, and vice versa.

It will be understood that, although the terms first, second, third, etc. may be used herein to describe various elements, these elements should not be limited by these terms. These terms are only used to distinguish one element from another element.

The disclosure herein is not limited by construction material(s) to the extent that any such materials satisfy the structural and/or functional requirements. For example, any material may be used so long as it satisfies the rigid structural and related functional requirements for which it is being used. In one embodiment, stainless steel may be preferred for a rinse vessel; however, other material of sufficient rigidity will suffice as well, if it is possible and practical for such material to support or embody the necessary functionality.

It is an object of the present disclosure to provide a rinsing and sanitizing system that conserves water.

Another object of the disclosure is to improve the speed and efficacy of rinsing and/or sanitizing items.

Another object of the disclosure is to provide a system that is adaptable and programmable for different types of rinsing and/or sanitizing.

Another object of the disclosure is to provide a modular system where parts can be added or subtracted as needed.

Yet another object of the disclosure is to provide a system that can connect to existing dipper well systems.

Other objects of the disclosure will become clear upon a review of the disclosure herein.

Figures illustrating the components show some elements that are known and will be recognized by one skilled in the art. The detailed descriptions of such elements are not necessary to establish an understanding of the present disclosure, and accordingly, are presented only to the degree necessary to facilitate an understanding of the novel features of the present disclosure to one having skill in the art.

In general the present disclosure, herein described, is an apparatus with a water source for cleaning an item (unclaimed), comprising (including) a vessel, and an assembly that allows for either a spray or recirculating mode of operation, which will be shown in more detail in the figures that follow. The assembly that allows for either a spray or recirculating mode of operation has a pressure regulator that regulates the water pressure, a water pump, a recirculation and spray flow path, a flow sensor, nozzles to spray utensils or other items, and a controller that controls the components responsible for monitoring and delivery of water and sanitizer(s). The trough-like or cylindrical apparatus is preferably made of stainless steel, and has an open top area for utensils and other items. The dimensions can vary according to the use. There are nozzles running along the length or over the top area of the apparatus that may vary in position, in number, and in type of spray nozzle. There is a wedged shaped basket/cage under the opening of each rinse area that will rotate the utensil so that the utensil will be rinsed effectively. The modified wedge shape basket/cage forces items to rotate and assume the correct orientation for the conical spray to effectively rinse.

The use of a regulator aids in the reduction of water consumption by reducing the water pressure. By lowering the water supply pressure, less water is used, and it puts less stress on the other components. The spray nozzle(s) are designed for improved rinse performance at this reduced water pressure. It also eliminates excess spraying outside of vessel while in spray mode. Moreover, it creates continuity of pressure for the dipper well, in geographic areas regardless of the local water pressure.

There may be a wedged shaped basket/cage that rotates the utensils in one of two directions so the spray nozzles can effectively rinse the utensils with a conical spray pattern. A wedged shaped basket/cage that rotates the utensils so the conical spray rinses the front and the back of the utensils provides a more effective rinsing of the utensils.

A heat source, quaternary sanitizer, ozone treatment, or UV irradiation can be incorporated to disinfect the utensils independently, or in combination. For a routine ozone treatment the ozone can be generated by a corona discharge or pulled from the UVC bulbs production of ozone. UVC bulbs will generate ozone that can be drawn into suspension with the water via a venturi valve. The unit could also use the light emitted from a UVC bulb to sanitize with UV light. The UV light would need to be in close proximity to the items needing to be sanitized. The exposure time or ozone generation time is fully adjustable to suit the needs of the application. The rinse time is determined by the type of material and the material's viscosity.

The size of both the round and the elongated trough-like dipper well may vary in diameter, length, width, and height, depending on the use of the apparatus. With the use of a controller, the spray time, the ozone treatment and/or the UV irradiation exposure time can be adjusted to satisfy the end user.

Figure 2:
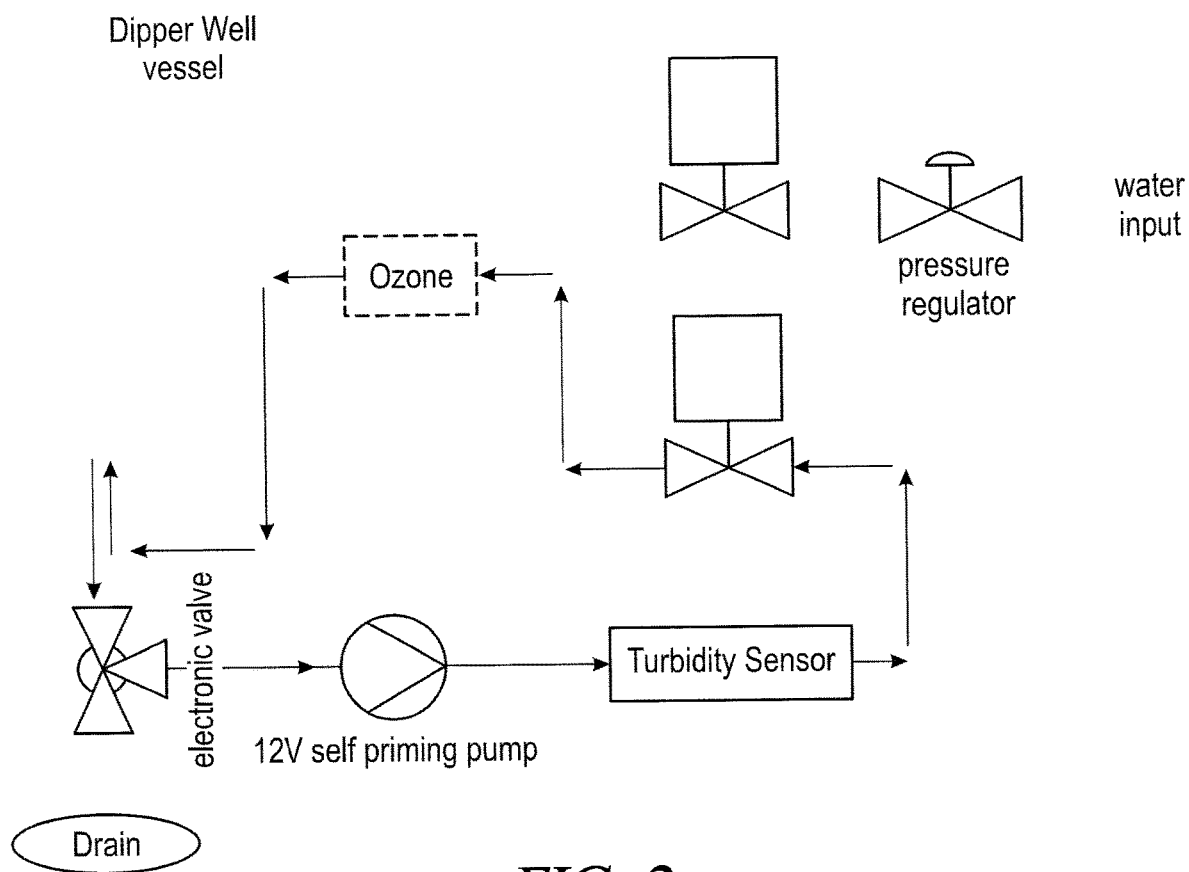
FIG. 2 is a process drawing of a recirculating embodiment for both round and elongated dipper wens.

Turning now to the figures for more details, FIG. 1 is a process drawing of the spray embodiment. Shown is the round mode but both the round and elongated dipper wells work by the same process. The water flow is from a water input through a pressure regulator, through an ozone/UVC generator, and into a vessel through conical spray nozzle(s). The water flows out of the vessel through a drain. The parts of the process will be shown in more detail in other figures. FIG. 2 is a process drawing of the recirculating embodiment. Although shown for the round dipper well, the elongated dipper well process is the same. When in recirculating mode, the water flow is through the turbidity sensor, through the ozone venturi valve/UVC, and into the vessel. The water then flows out of the vessel and again through a turbidity sensor and an ozone venturi valve into the vessel in a recirculating path, as will be shown in more detail in other figures.

In the preferred embodiment, a vessel 810 is preferably made of stainless steel and may come in two styles: a cylindrical open-top vessel, as shown in FIG. 3 through FIG. 6, and an elongated trough-like apparatus, as shown in FIG. 7 through FIG. 11. The elongated trough-like apparatus is essentially a rinse bay vessel or dipping well having the same features as the round vessel and working in the same way as the round vessel.

Figure 3:
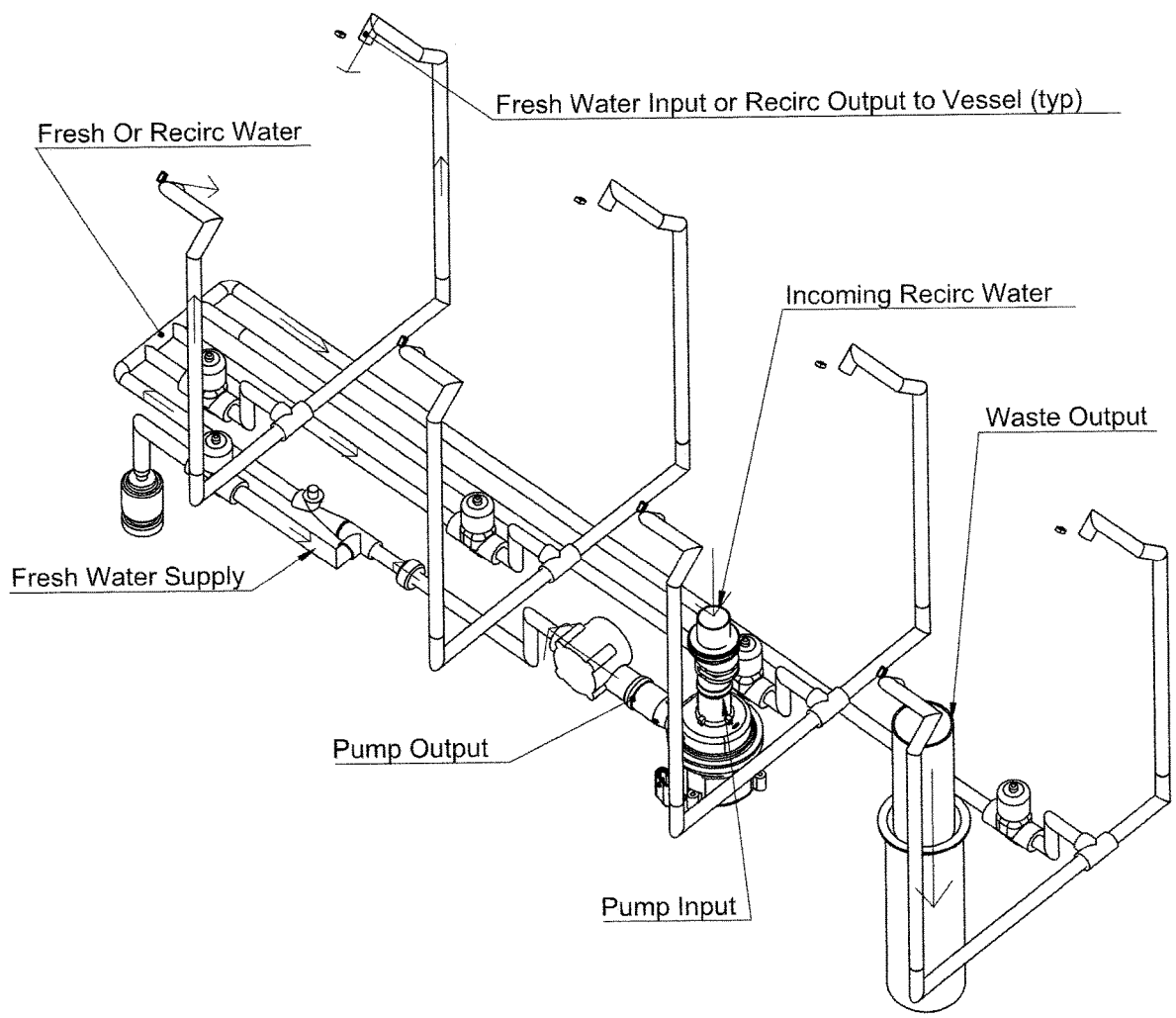
FIG. 3 depicts a round dipper well in the recirculating mode with the stand tube insert.

As shown in FIG. 3, the present disclosure herein described is an apparatus for use with a water source for cleaning an item 900 (unclaimed), comprising (including) a vessel 810, a drainage 530 having a recirculation outlet 580 in a sidewall or extending over the top of the vessel. It also includes a recirculation inlet 570 extending over a top and into the vessel submerged in the desired soaking level or near the bottom of the vessel 810. There is also a water source flow path that merges into a recirculation water flow path connecting the water source inlet 100 with the recirculation outlet 580; the flow path may further include a food grade centrifugal water pump 330, and a turbidity sensor 320 that senses the turbidity of water. The flow of the water source is controlled by a solenoid valve 200.

The apparatus may further include a sensor for sensing the water level 360 within the vessel 810 at the soaking level. This signals a controller 300 to open and close the water source solenoid valve 200, and controls the starting and stopping of a pump 330. The sensor for sensing the water level 360 can be placed on a side of the vessel or coming over a top of the vessel. Activation of a controller signals a water source solenoid valve 200 to open and allow water to flow into a fresh water inlet 100 until filling the vessel 810 to the soaking level, whereupon the sensor for sensing water level 360, or due to a preprogrammed time, a controller 300 closes a water source solenoid valve 200 and activates a pump 330 to pump water through a recirculation flow path, and exit a recirculation outlet 580. When a controller 300 senses the turbidity of recirculation water by a turbidity sensor 320, to be above a predetermined first threshold, a controller will open a water source solenoid valve 200 for water to flow out a fresh water output 100, causing the water level to increase enough for the mixture overflow down a stand tube 510. This will continue until a controller 300 senses that the turbidity of recirculation water is below a predetermined second threshold. At that time, a controller closes a water supply solenoid valve 200. The sensor for maintaining the water level within the vessel 810 may include controller programming enabling fresh water flow through an inlet for a predetermined volume or by a water level sensor 360.

Figure 4:
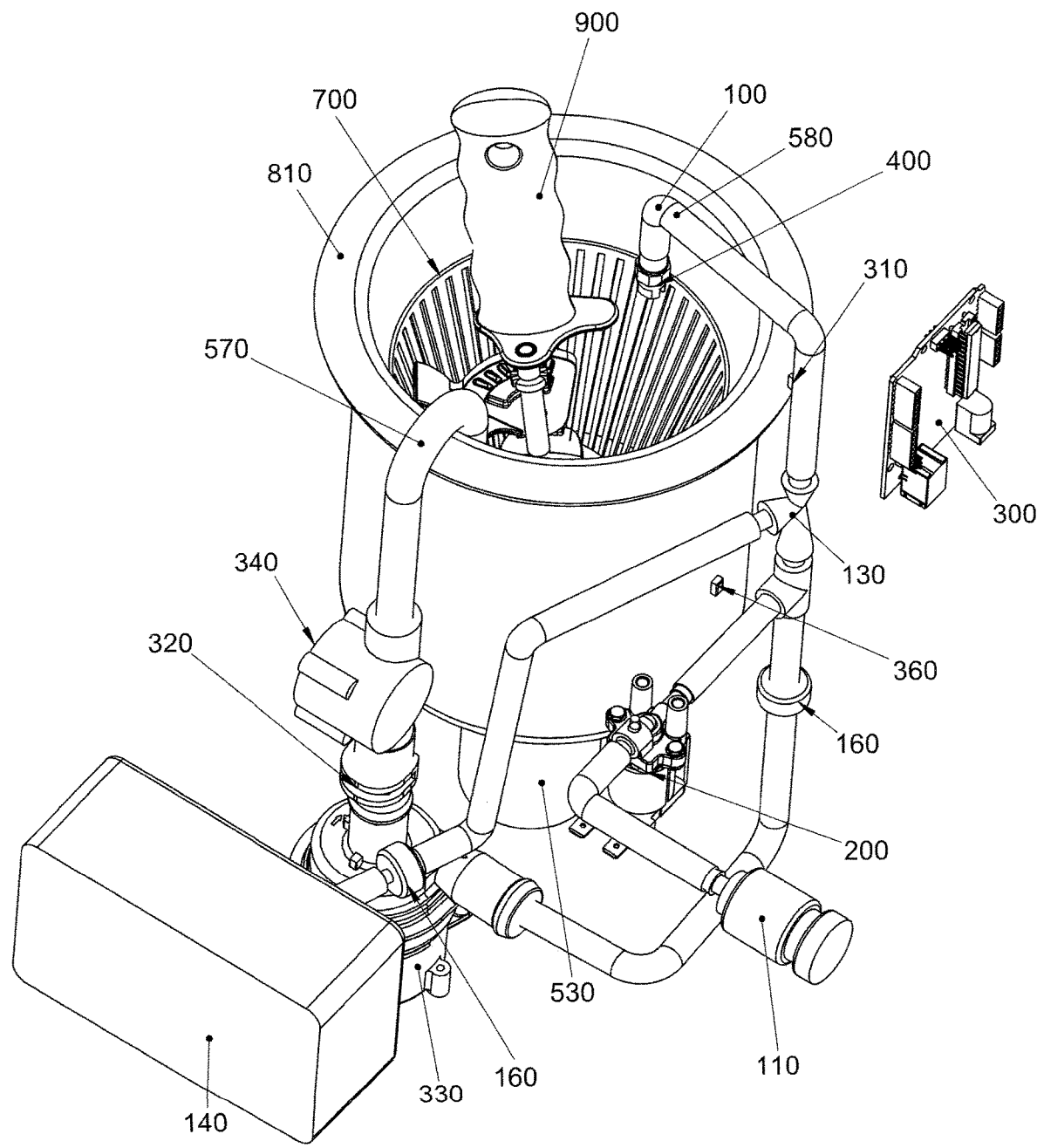
FIG. 4 depicts a round dipper well in the spray mode with the cage/basket insert.

Preferably, a controller 300 will be programed to sufficiently control each of the identified functionalities. A water level sensor 360 within the vessel 810 may include controller programming enabling fresh water flow through an inlet for a predetermined volume. A water level sensor within the vessel 810 may include controller programming enabling fresh water flow through a fresh water inlet 100 until the water reaches a water level sensor 360. The placement of a water level sensor 360 on the vessel 810 may vary. It signals the detection of the presence of water at a soaking level. Fresh water flow is allowed into the vessel 810 only on a needed basis. The water source flow path may further include a source water pressure regulator 110 for decreasing the pressure of source water, As shown in FIG. 4 the recirculation water flow path may further include a flow meter 340 and/or flow sensor for determining the presence and amount of water being circulated. The recirculation water flow path may further include additional sanitizing of the utensils by one selected from the group of ozone, UV irradiation, heat and/or chemical disinfectants, and combinations and mixtures thereof. More particularly, the sanitizing may include an ozone generator 140 functionally coupled to a venturi valve 130 along the recirculation and/or fresh water path and controlled by a controller 300. Additionally or alternatively, further sanitizing with UV irradiation, heat and/or chemical disinfectants, and combinations and mixtures thereof, may include a source of chemical disinfectant(s) functionally coupled to a source water flow path, while the heat source would be from a hot water line to the vessel. Within the vessel 810 there is a wedged shaped basket/cage 700 under the opening of each rinse area that will rotate the utensil 900 (unclaimed) so that the utensil will be rinsed effectively. The source water flow path may further include a spray nozzle 400 flow path. The water level sensor 360 within the vessel 810 may also include controlled programming enabling fresh water flow through a nozzle(s) 400 when a sensor 310, signals the presence of a utensil/item 900 as shown in FIG. 4. The apparatus may include a plurality of wedge shaped basket/cage holders 700, for holding utensils while the water recirculates within the vessel 810 without materially impeding contact by such water.

Figure 5:
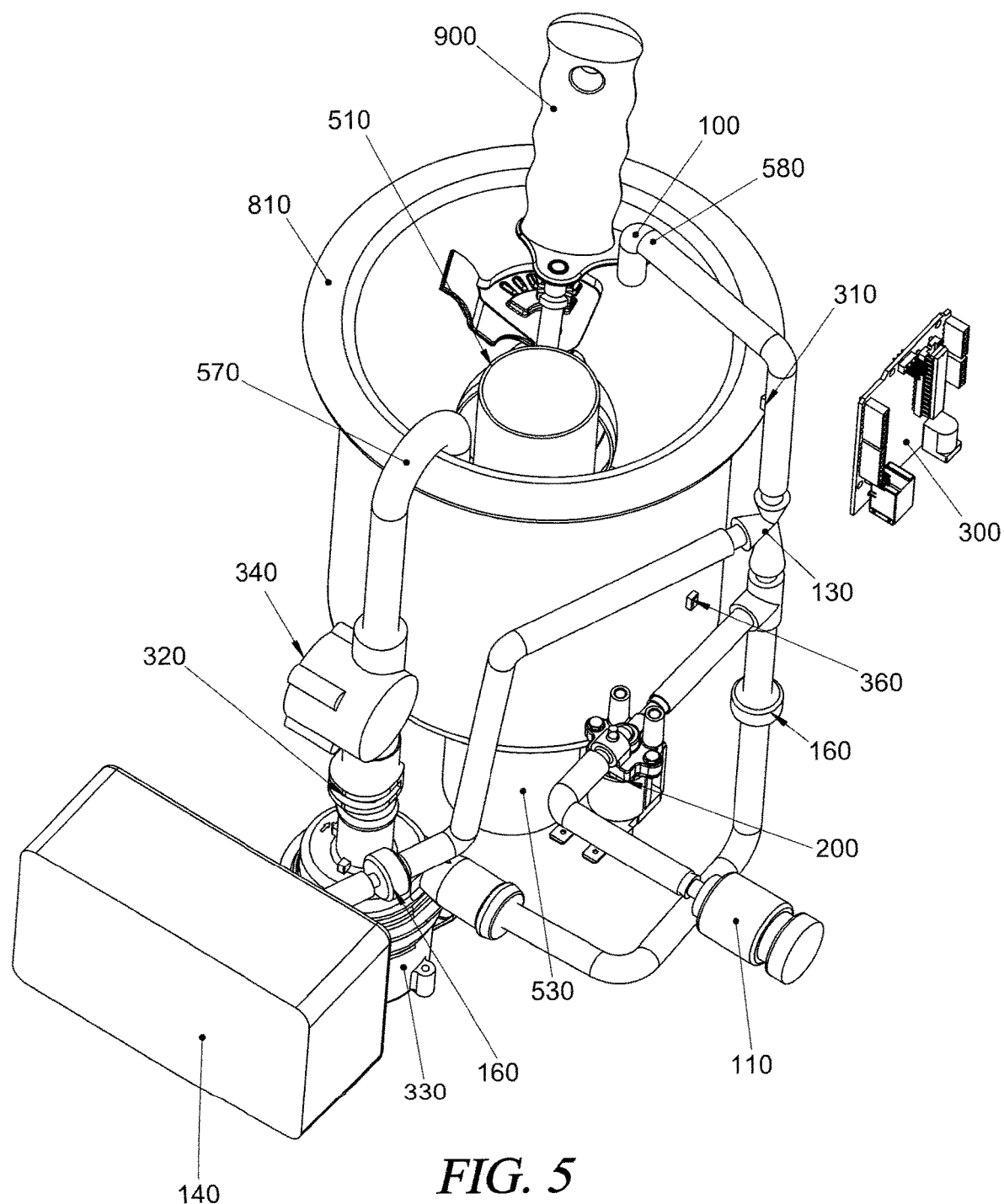
FIG. 5 depicts a round dipper well with the overflow stand tube, overflow bowl insert, and wedged shaped basket/cage assembly removed from the housing.
Figure 6:
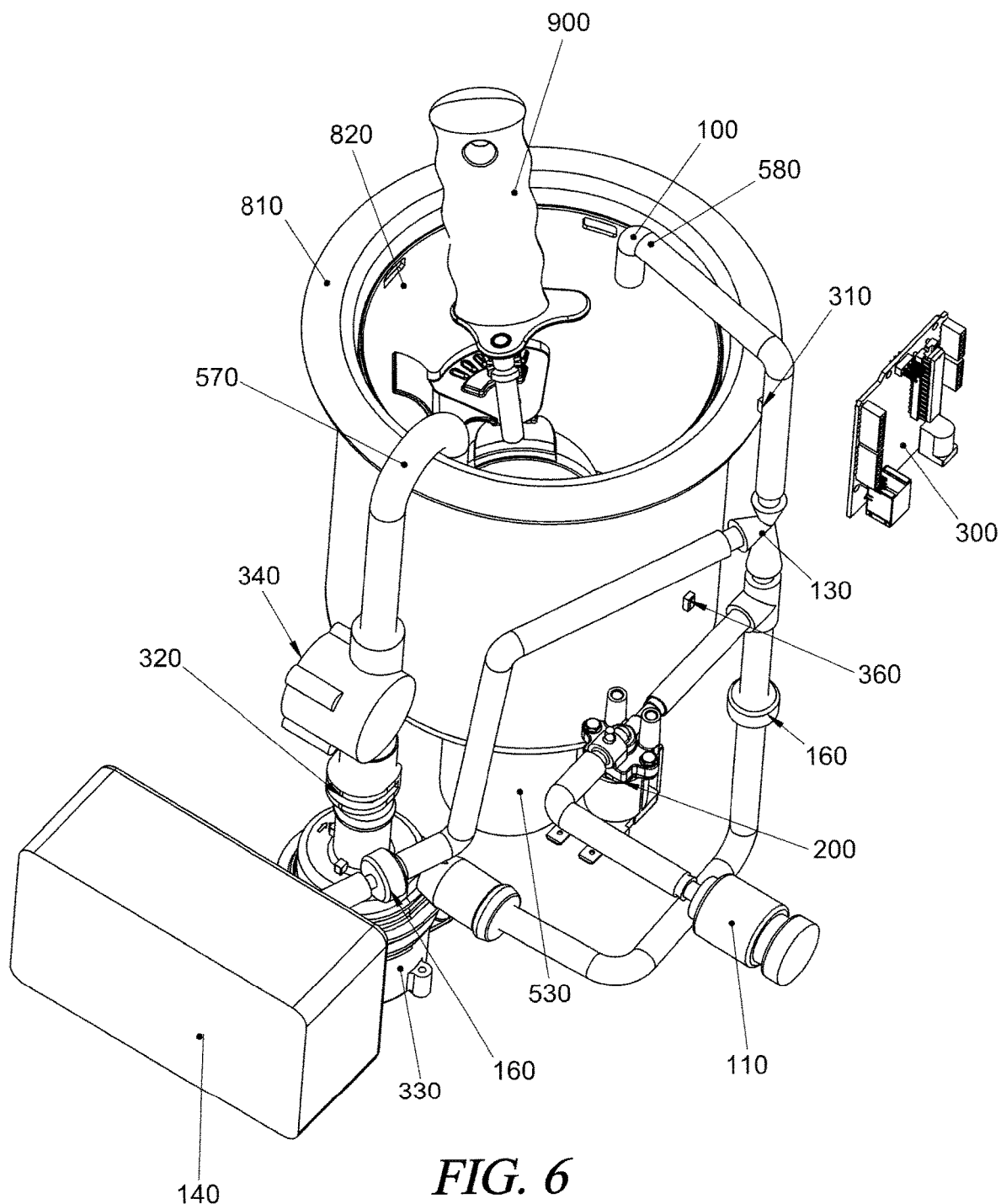
FIG. 6 depicts a round dipper well in the recirculating embodiment with the overflow bowl insert.

As shown in FIG. 5, there are secondary vessels that insert into the primary vessel 810. The dipper well insert overflow bowl 820 is a secondary vessel that inserts within the primary vessel 810. It includes a plurality of apertures around the upper circumference of the vessel, above the soaking level. The removable overflow stand tube 510 can also insert within the primary vessel 810. In the recirculating embodiment, either the overflow bowl 820 or the overflow stand tube 510 are inserted. When the overflow bowl 820 is inserted, as shown in FIG. 6, or the overflow stand tube 510 is inserted, as shown in FIG. 3, the wedge-shaped basket/cage 700 is not needed, as shown in FIG. 4. The basket/cage 700 is used in the spray embodiment rather than overflow bowl 820.

Figure 7:
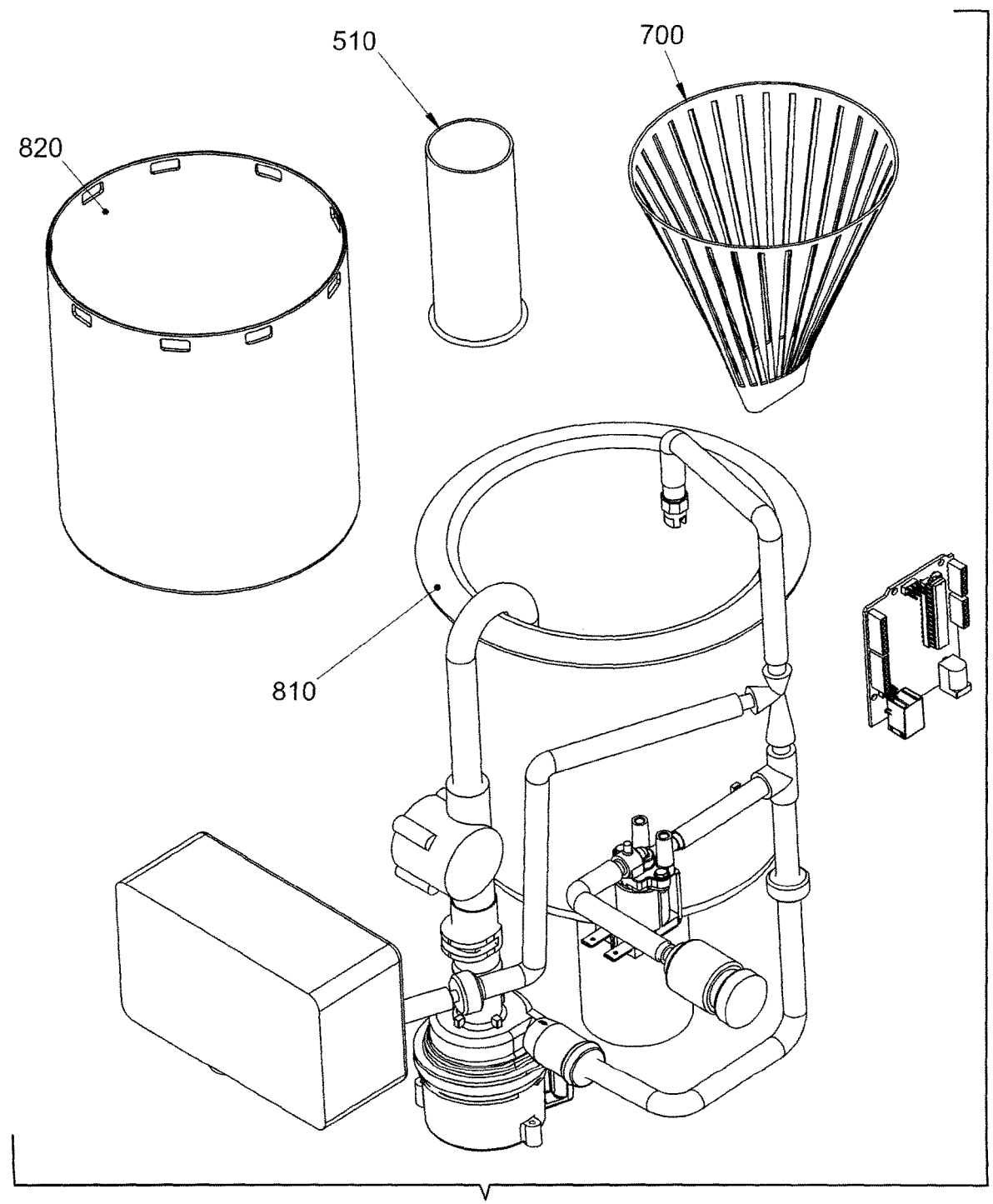
FIG. 7 depicts an isometric view of an elongated trough-like dipper well showing an elongated multi-bay dipper well and the multi-bay wedged shaped basket/cage assembly, removed from the housing.

As shown in FIG. 7, the present disclosure is an apparatus for cleaning a utensil 900 (unclaimed), comprising (including) a primary vessel 810, an open trough area with a wedge shaped basket/cage 700 under the opening of each rinse area that will rotate the utensil 900 so that the utensil will be rinsed effectively. The wedge shape basket/cage 700 forces items to rotate and assume the correct orientation for the conical spray to effectively rinse.

Figure 8:
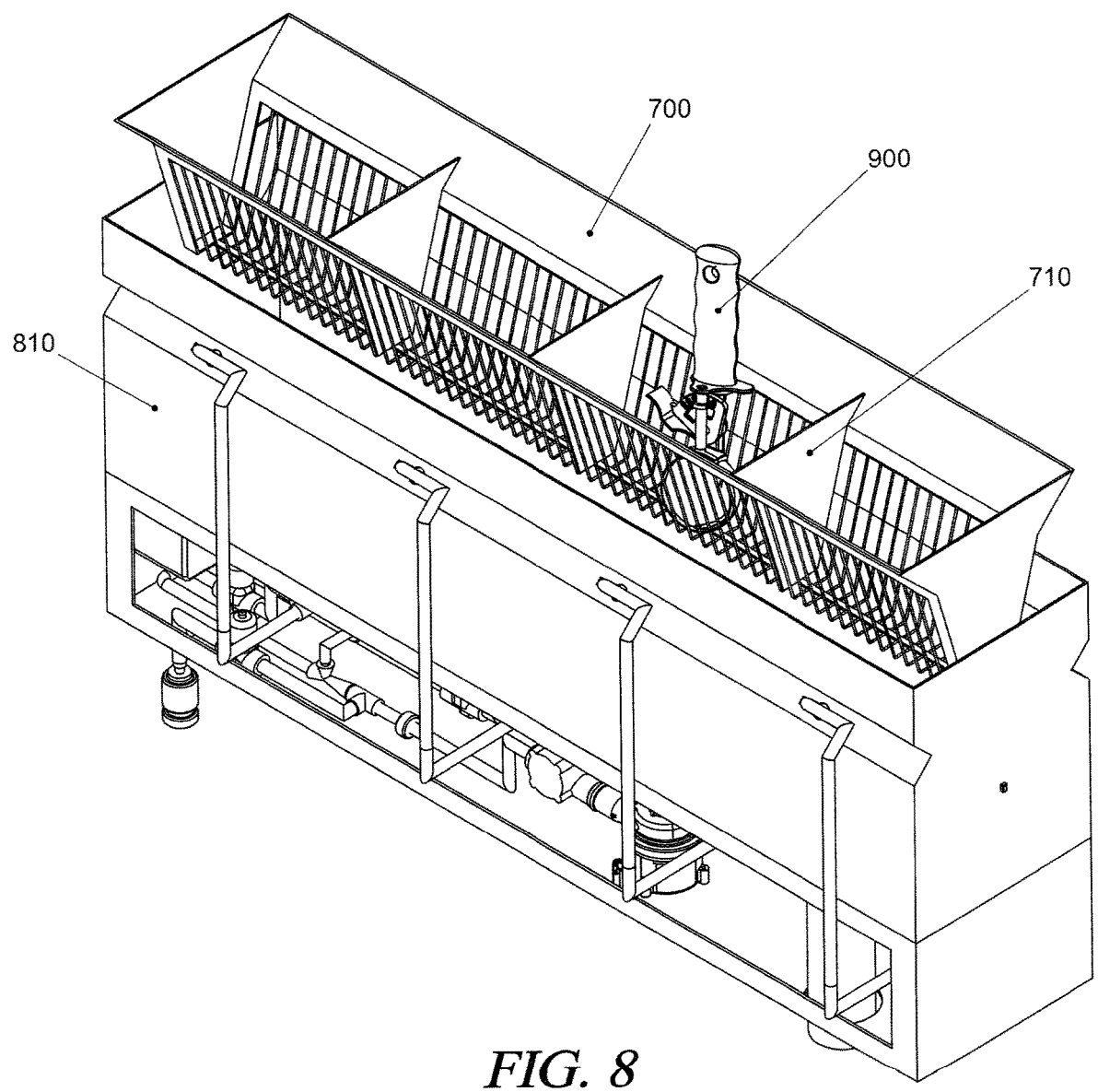
FIG. 8 depicts an isometric view of the housed portion of the spray embodiment of a dipper well of FIG. 7, with the vessel walls removed and with the vessel floor removed except for the drain cover (remaining for orientation and context).
Figure 9:
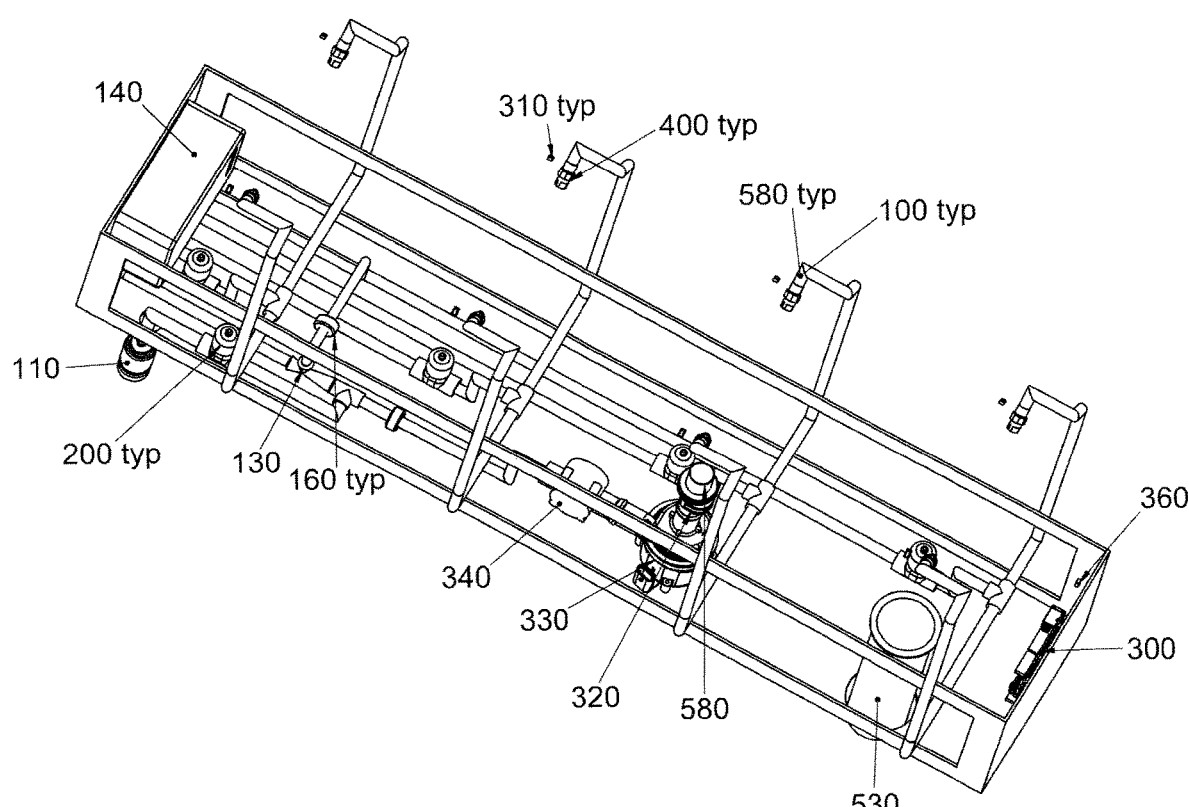
FIG. 9 depicts an isometric view of the housed portion of the recirculating embodiment of a dipper well of FIG. 7, with the vessel walls removed and with the vessel floor removed except for the drain cover (remaining for orientation and context).

FIG. 8 and FIG. 9 show a trough-like elongated model that can be either a spray embodiment (FIG. 8) or a recirculating embodiment (FIG. 9). Both FIG. 8 and FIG. 9 have the vessel walls and vessel floor removed except for the drain cover, which remains for orientation and context. A trough-like elongated model differs from the round model in size and shape but is the spray embodiment process of FIG. 1 with spray nozzles 400 mounted at the desired height above the main vessel to enable spraying utensils that are positioned within the bowl for cleaning and/or sanitizing, or the recirculating process of FIG. 2 with a recirculation outlet 580 in a sidewall or extending over a top of the vessel 810 and a recirculation inlet 570 extending over a top and into the vessel submerged in the desired soaking level or near the bottom of the vessel 810. The removable overflow stand tube 510 that can also insert with the primary vessel is shown in FIG. 9. Also included is a water source flow path merging into a recirculation water flow path connecting the recirculation outlet 580 with the fresh water inlet 100, the flow path further including a water pump 330, a turbidity sensor 320 sensing the turbidity of the water, and a solenoid valve 200 controlling the flow of the fresh water source. This embodiment may further include a sensor for sensing the water level 360 within the vessel 810 at the soaking level and signaling a controller including a controller 300 controlling the opening and closing of the fresh water source solenoid valve 200, and controlling the starting and stopping of the pump 330.

Activation of a controller signals the water source valve 200 to open and water to flow into the fresh water inlet 100 until filling the vessel 810 to the soaking level, whereupon the sensor for sensing water level, or due to a preprogrammed time, a controller closes the water source valve and activates the pump to pump water through the recirculation flow path, and exit the recirculation outlet 580. When a controller 300 senses the turbidity of recirculation water, by a turbidity sensor 320, to be above a predetermined first threshold, a controller will open a water source solenoid valve 200 for water to flow out a fresh water output 100, causing the water level to increase and the mixture will overflow down a stand tube 510 as shown in FIG. 9. This will continue until a controller 300 senses that the turbidity of recirculation water is below a predetermined second threshold. At that time, a controller closes a water supply solenoid valve 200. The sensor for maintaining the water level within the vessel 810 may include controller programming enabling fresh water flow through the inlet for a predetermined volume.

The water source flow path may further include a source water pressure regulator 110 decreasing the pressure of source water, and a flow meter 340 or flow sensor monitored by a controller. The recirculation flow path may further include a check valve 160 preventing the flow of water from traveling the wrong direction. The recirculation flow path may also include an ozone generator 140, and/or a source for UV irradiation, and/or heat, and/or chemical disinfectants, and combinations and mixtures thereof.

In operation of the spray embodiment, a controller, 300 directs the apparatus to provide fresh nozzle-sprayed water that flows through a pressure regulator 110; after the sensor (s) 310 detect one or more utensils positioned to be cleaned in the vessel 810, a controller opens one or more solenoid valves 200 to open the waterway(s) to allow the nozzle(s) to start spraying water on the utensil(s) within the vessel 810. When the water flows through the venturi valve, suction pulls the ozone from the ozone generator 140 into the water resulting in ozone treated water. This ozone-treated water is sprayed on the items. Spray water (and microbes killed and/or removed by the spray) exits the apparatus through a drain 530 at the bottom. When the duration of spraying reaches a threshold programmed within a controller, the controller closes the valve(s) to stop the spraying and a controller turns off the ozone generator 140.

The apparatus has a recirculating embodiment where water held in the vessel 810 (at a level allowing the utensil to soak in moving water) is recirculated back into the vessel 810 through a tubing assembly 230. The typical elongated multi-bay apparatus has a rinsing/soaking vessel 810 having a bottom drain 530, a recirculation inlet 570 on the bottom or extending over the top the vessel submerged in the desired soaking level, and a recirculation outlet 580 in the vessel sidewall or extending over the top of the vessel. In this embodiment there is obstruction of the drain 530; in one embodiment having a plurality of soaking bins, the user inserts an overflow stand tube 510 in the drain 530, thereby essentially raising the drain opening level to above the soaking level.

When the unit is turned on the vessel 810 will automatically fill with fresh water entering through the recirculation outlet 580 in the vessel sidewall or extending over the top of the vessel 810. This auto fill can be based on a timed supply of water, which can be programmed based on the volume of the vessel and flow rate of water. Alternatively, the auto fill can be based on a sensor 360 that detects when the water reaches the desired level within the vessel 810. To initiate filling, a controller signals the valves 200 to open for filling the vessel with fresh water through the recirculating outlet 580. When the water level reaches the soaking level a controller signals a valve to close and the pump to start pumping the water in the recirculating flow path. A controller is programmed to run a set of commands in a certain sequence of "if/then"; for instance, if fresh water has run for a specific programmed time or volume, then the pump will turn on. The water then exits the vessel 810 through the recirculating inlet 570. At one point along the way of recirculation, the recirculating water passes a turbidity sensor 320; when the water turbidity exceeds a threshold programmed within a controller, the controller signals the valve 200 for the fresh water supply to open for filling the vessel with fresh water through the recirculation outlet 580. The apparatus may include a check valve 160 that allows the water to flow in one direction, thus preventing the flow of water from traveling in the wrong direction. In this instance, the water flows away from the recirculation pump 330.

When the water becomes too cloudy, fresh water is also introduced, causing a displacement of used water, to overflow into the drain. The supply of fresh and used water entering the recirculation outlet raises the water level within the vessel 810 to the drain level so that the upper layer of water drains out while fresher water continues recirculating past the turbidity sensor 320. When the water turbidity decreases below a threshold programmed within a controller, the controller signals the solenoid valve 200 to close so that no more fresh water enters the vessel 810. The recirculation soaking then continues as before. When the recirculation embodiment is turned off, everything stops. The user can remove the overflow stand tube 510 to allow the water to drain.

The typical single-bay dipper well apparatus has a single rinsing/soaking vessel 810 having a drain 530 on the bottom, a recirculation inlet 570 on the bottom or extending over the top and into the vessel submerged in the desired soaking level, and a recirculation outlet 580 in the vessel sidewall or extending over the top of the vessel. Spray nozzles 400 mounted at the desired height above this main vessel 810 enable spraying utensils that are positioned within the bowl for cleaning and/or sanitizing. For the recirculating embodiment, the user inserts an overflow bowl 820 into the vessel 810, positioned much the same as a double-boiler but for the purpose of creating a pooling effect. The overflow bowl 820 has an opening aligned with the recirculation inlet of the main vessel 810, enabling that water supply to enter the inner vessel or the dipper well insert overflow bowl 820, wherein the utensils are positioned for soaking. The inner vessel or the dipper well insert overflow bowl 820 also has apertures around the upper circumference of the vessel, above the recirculation outlet 580, allowing the drainage of turbid soak water when both fresh water and recirculation water are being pumped into the recirculation outlet 580 as described above. The overflow stand tube 510 can serve the same purpose as the overflow bowl. The single-bay dipper well apparatus functions in the same manner as the multi-bay apparatus.

Figure 10:
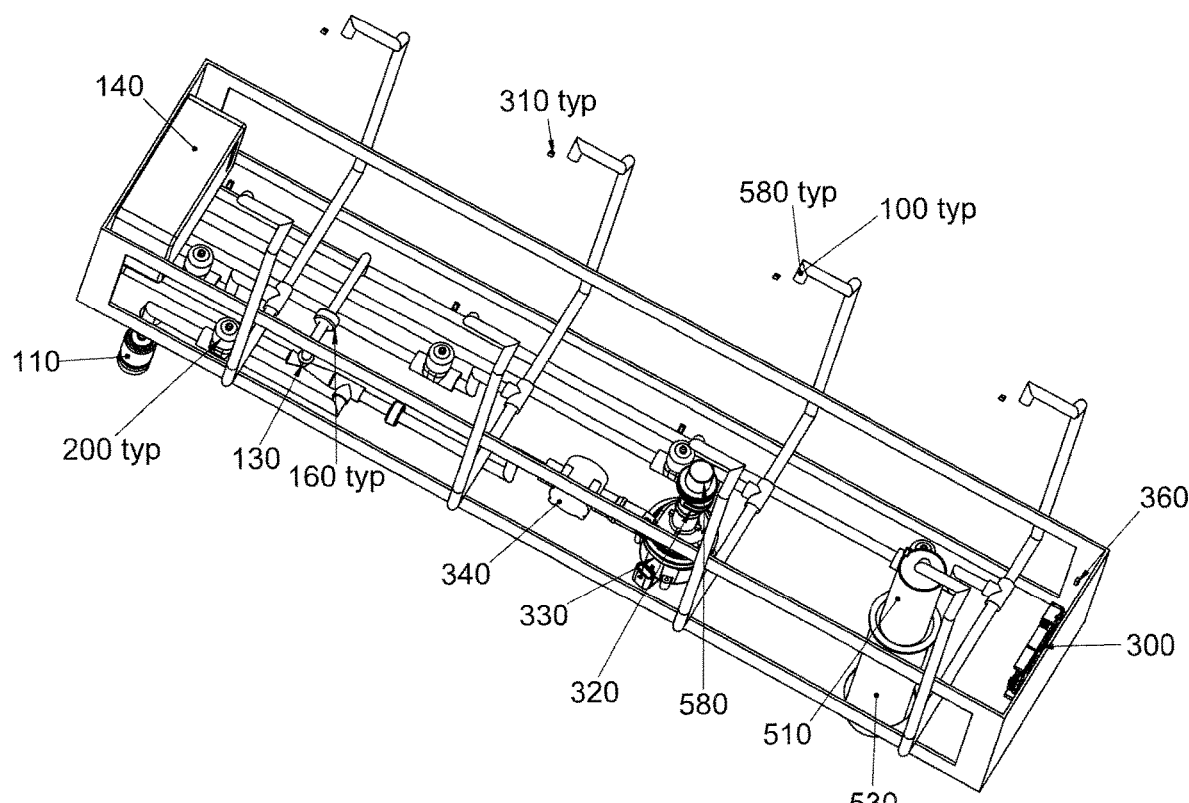
FIG. 10 depicts an isometric view of the dipper well of FIG. 8 with arrows showing the flow of water into a vessel in spray embodiment.
Figure 11:
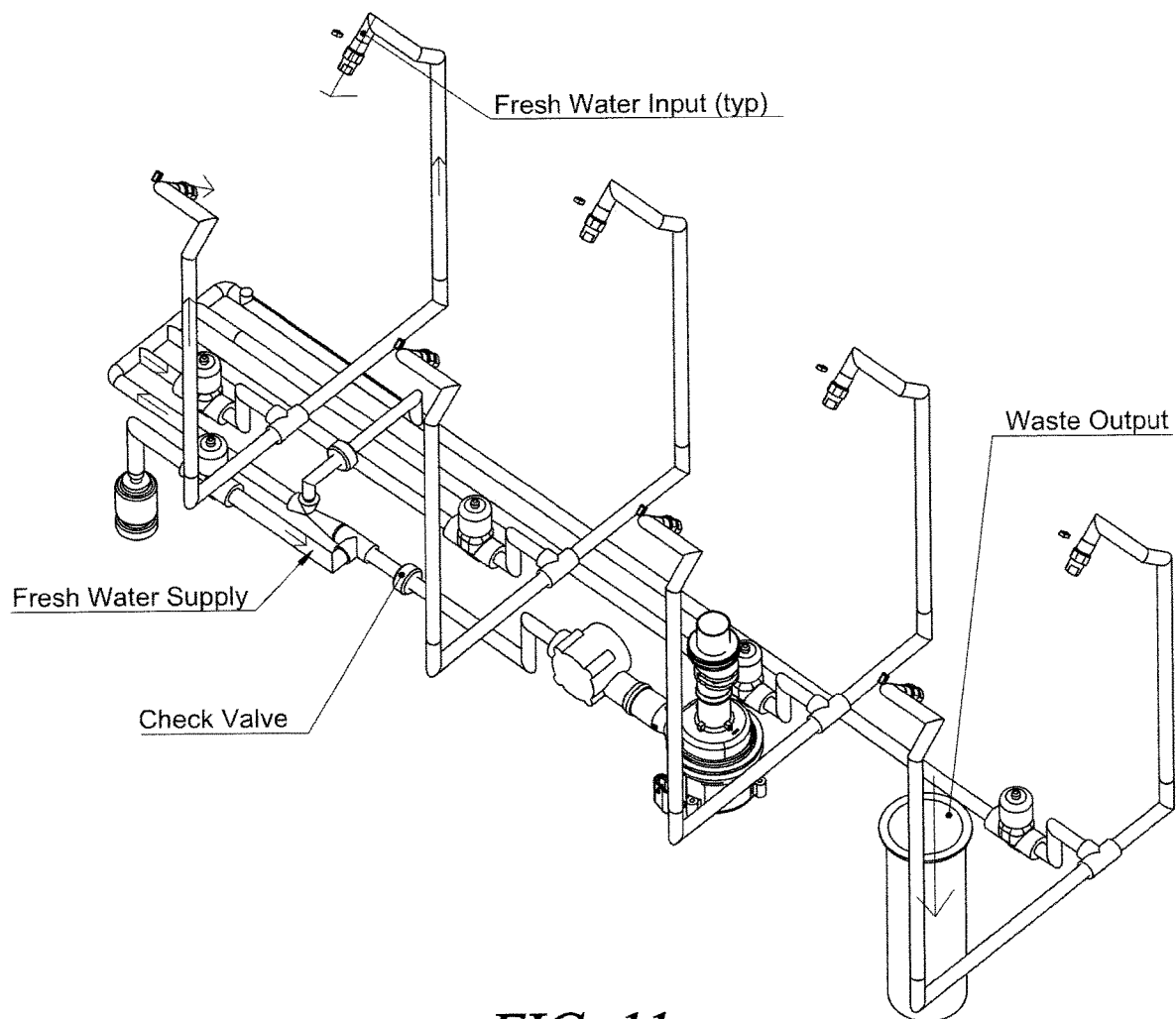
FIG. 11 depicts an isometric view of the dipper well of FIG. 9 with arrows showing the flow of water into a vessel in recirculation embodiment.

FIG. 10 and FIG. 11 show the path of the water in the elongated trough-like embodiment. FIG. 10 shows the flow path for the spray embodiment while FIG. 11 shows the flow path for the recirculating embodiment. For the spray embodiment, fresh water comes from a fresh water supply and flows in the direction of the arrows through the check valve, through the pump, through the ozone venturi valve, into the vessel, and out the drain. For the recirculating embodiment, fresh water comes from a fresh water supply, through the pump, through the ozone venturi valve and into the vessel as with the spray embodiment. Instead of flowing to the drain, the water recirculates throughout the vessel until the turbidity is sensed to be too high and it then is mixed with fresh water to lower the turbidity.

The utility of the apparatus disclosed herein has been established by studies.

Example 1: Efficacy of Water Efficient Dipper Well Combined with UV-C for Control of Microbial Growth Description of the Dipper Well Apparatus:
In this study, an elongated dipper well apparatus was used, having a stainless steel design, with dual basket rinse stations for cleaning utensils. Each rinse station had two 3-inch UV-C (254 nm) bulbs. Water consumption was estimated at 0.226 gallons per 10 s cycle.

Description of Project:
First, the study compared the effectiveness of two treatments (water rinse+UV-C and water rinse only) to remove and/or inactivate non-pathogenic *E. coli* inoculated onto a stainless steel ice scoop. To do this, a sterile ice cream scoop was dipped into either dechlorinated tap water (DTW)+*E. coli* ($10^6$ colony forming units [cfu] per ml) or 10% skim milk (SM) media+*E. coli* ($10^6$ cfu/ml). After dipping the scoop in the inoculum, the scoop was placed in the rinse station and subjected to 3 different exposure times, with and without UV: 5 s, 10 s, and 30 s. Following exposure, both the scoop and rinse station basket were swabbed to recover remaining *E. coli*. The swabs were then placed in 2.25 ml of buffered peptone water (BPW), diluted, and 1 ml of each dilution was plated on 3M™ Petrifilm™ Aerobic Count Plates.

Second, the study assessed microbial growth during "continuous" use of the dipper well apparatus. This involved dipping the ice cream scoop in the inoculum every 10 minutes followed by treatment over a 2-hour period for each exposure and inoculum combination. At the end of the 2-hour period, the scoop and rinse station basket were swabbed to recover remaining *E. coli* and assayed as described above.

Last, the study compared the efficacy of a continuous flow system to remove *E. coli* from an inoculated ice cream scoop at 3 different treatments (5 s, 10 s, and 30 s) as well as over a 2-hour period of continuous use. Experiments were repeated in triplicate and dilutions were plated in duplicate.

Results:

1. Removal of *E. coli* by Two Different Treatments Over Varying Exposure Times.

Figure 12:
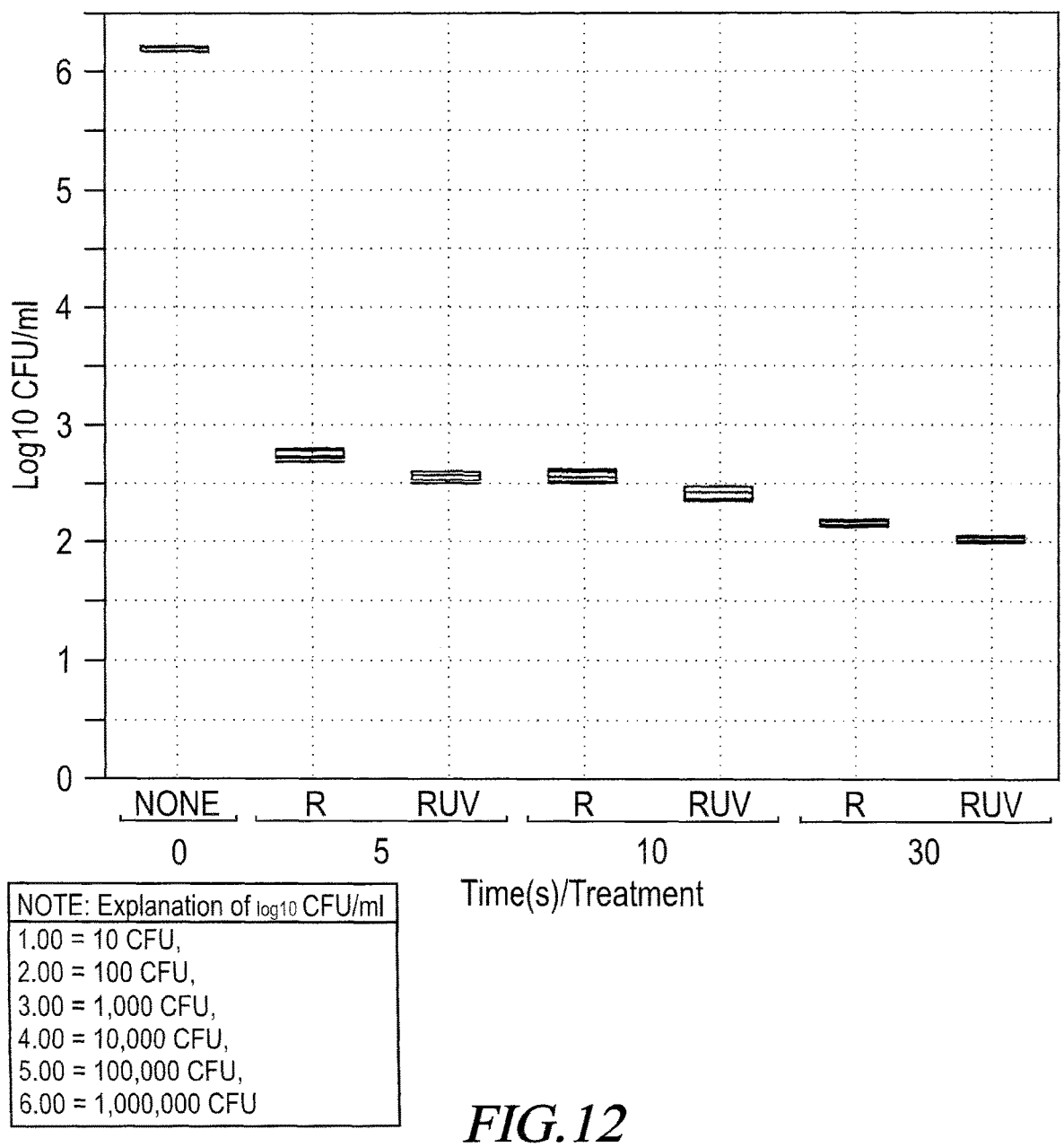
FIG. 12 shows a box plot indicating statistical variation in the efficacy of an elongated trough-like dipper well combined with UVC in exposure times for water rinse only and rinse+UVC treatment on utensils that were *E. coli* treated.
Figure 13:
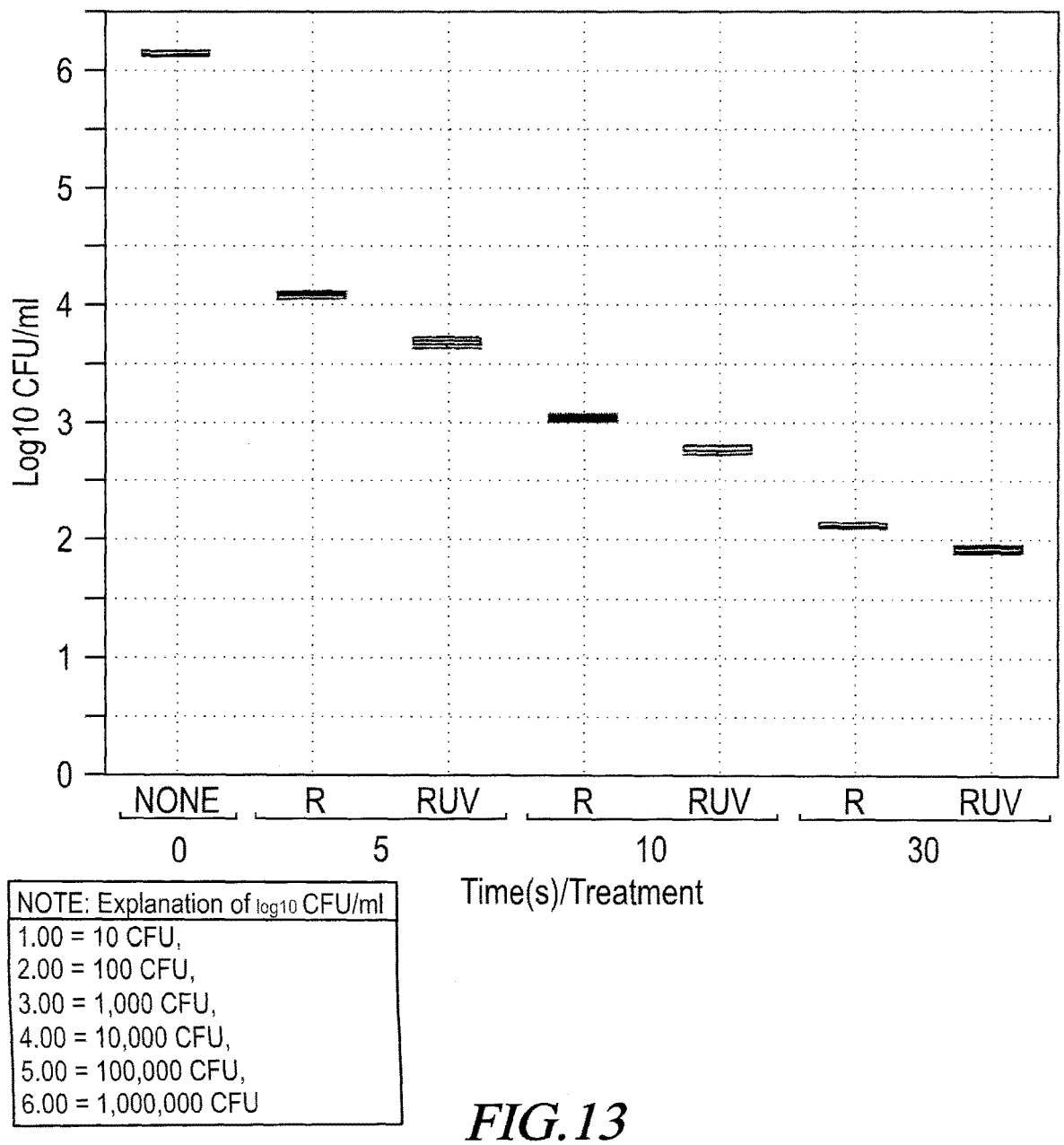
FIG. 13 shows a box plot indicating statistical variation in the efficacy of an elongated trough-like dipper well combined with UVC in exposure times for water rinse only and rinse+UVC treatment on utensils treated with 10% skim milk and *E. coli*.

Removal of *E. coli* was statistically significantly different between exposure times as well as between treatments (i.e. rinse spray with and without UV-C). FIG. 12 and FIG. 13 demonstrate the removal of *E. coli* in DTW and 10% SM, respectively. Although these values may not immediately appear different, the p-values were determined to be <0.05 by one-way analysis of variance (ANOVA) and confirmed by comparison of the mean values using Tukey-Kramer honestly significant difference test.

2. Microbial Persistence and/or Control During Continuous Use of the Dipper Well Apparatus.

Persistence of *E. coli* after 2 hours of continuous use (i.e. treatment every 5 minutes) was statistically significantly different between exposure times as well as between treatments (i.e. rinse spray with and without UV-C). FIG. 14 and FIG. 15 demonstrate the removal of *E. coli* in DTW and 10% SM, respectively. The p-values were determined to be <0.05 by one-way analysis of variance (ANOVA) and confirmed by comparison of the mean values using Tukey-Kramer honestly significant difference test. It is important to note that there was also a significant difference between the persistence of *E. coli*+DTW vs. *E. coli*+10% SM on the scoop at the end of the 2 hour period for treatment combinations. Overall, the data indicates that the addition of the UV-C during the rinse over long-term use will provide a protective barrier against the growth and/or persistence of total aerobic bacteria on the scoop or stainless steel utensils.

In addition to testing for the presence of *E. coli* on the scoop after the 2-hour period, the dipper well apparatus basket was also swabbed and tested for the presence of *E. coli*. For DTW+*E. coli*, the basket was free of *E. coli* for the rinse only and rinse+UV-C treatments at 10 and 30 s exposure times while at 5 s exposure, approximately 0 to 2 colony forming units (CFU) were present at the end of the 2-hour period with no difference in rinse only and rinse+UV.

However, for 10% SM+*E. coli*, the basket contained 80 and 33 CFU/ml after 2-hours at 5 s exposure times for rinse only and rinse+UV-C, respectively. At 10 s exposure times, 66 and 0 CFU/ml was recovered from rinse only and rinse+UV-C treatments, respectively. Finally, at 30 s exposure times, no *E. coli* were recovered from the basket. Please note that the *E. coli* counts at 5 and 10 s exposure times were significantly different indicating that the UV-C may play a protective role in preventing the persistence of *E. coli* in the dipper well apparatus basket.

3. Comparison of Continuous Flow Dipper Well with the Dipper Well Apparatus for Removal of *E. coli*.

The efficacy of a continuous flow system to remove *E. coli* from an inoculated ice cream scoop at 3 different treatment times (5 s, 10 s, and 30 s) as well as over a 2-hour period of continuous use was evaluated. The ability of the dipper well apparatus to remove *E. coli* inoculated in DTW from the ice cream scoop was significantly better than the continuous flow system at 5 and 10 s rinses; however, the continuous flow system was significantly better at removing *E. coli* with a 30 s rinse. In contrast, the dipper well apparatus was significantly better at removing *E. coli* inoculated in 10% SM from the ice cream scoop at rinse times.

Figure 16:
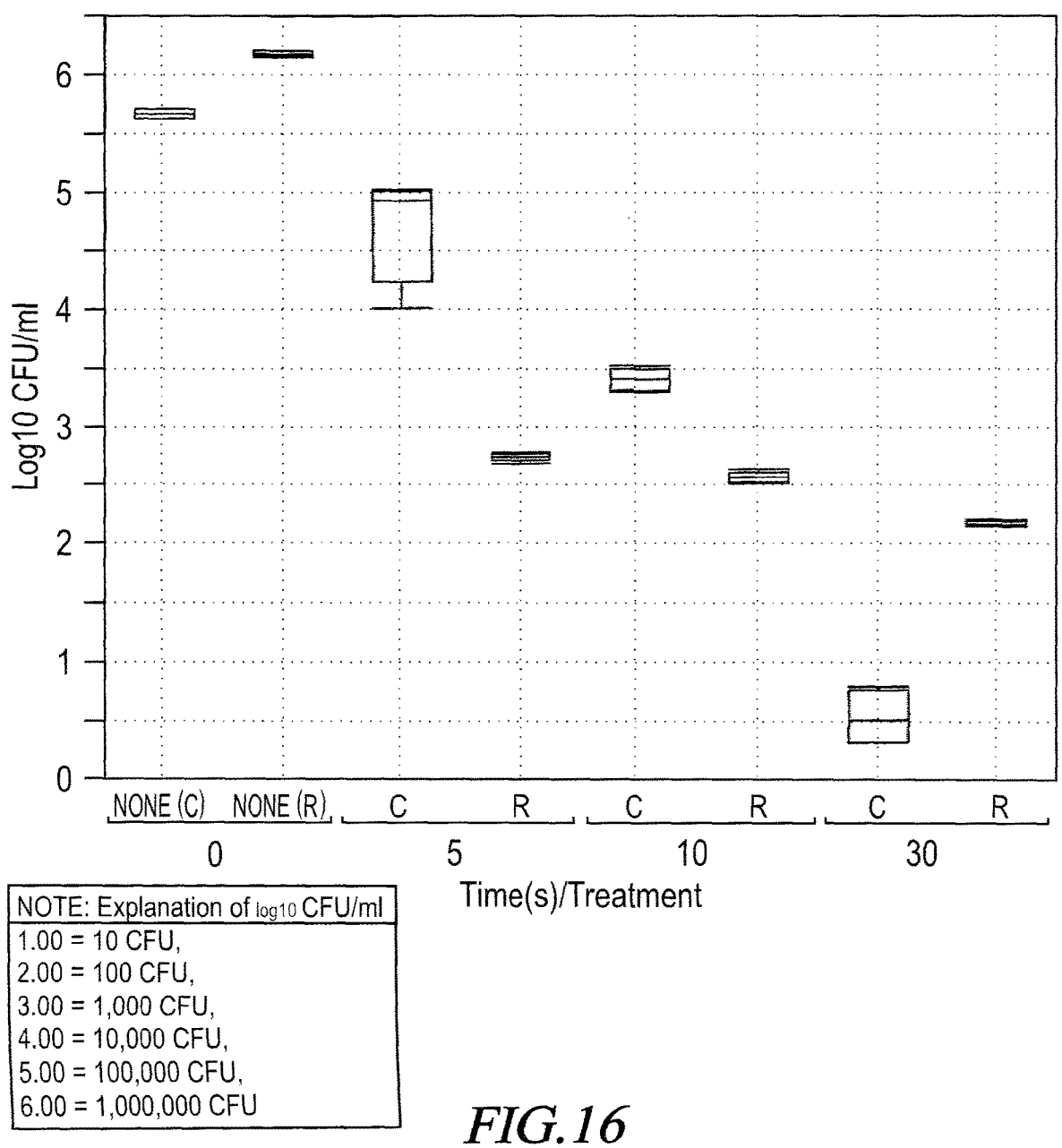
FIG. 16 shows a box plot indicating statistical variation in rinsing in a continuous flow well and in an elongated trough-like embodiment on utensils that were *E. coli* treated.
Figure 17:
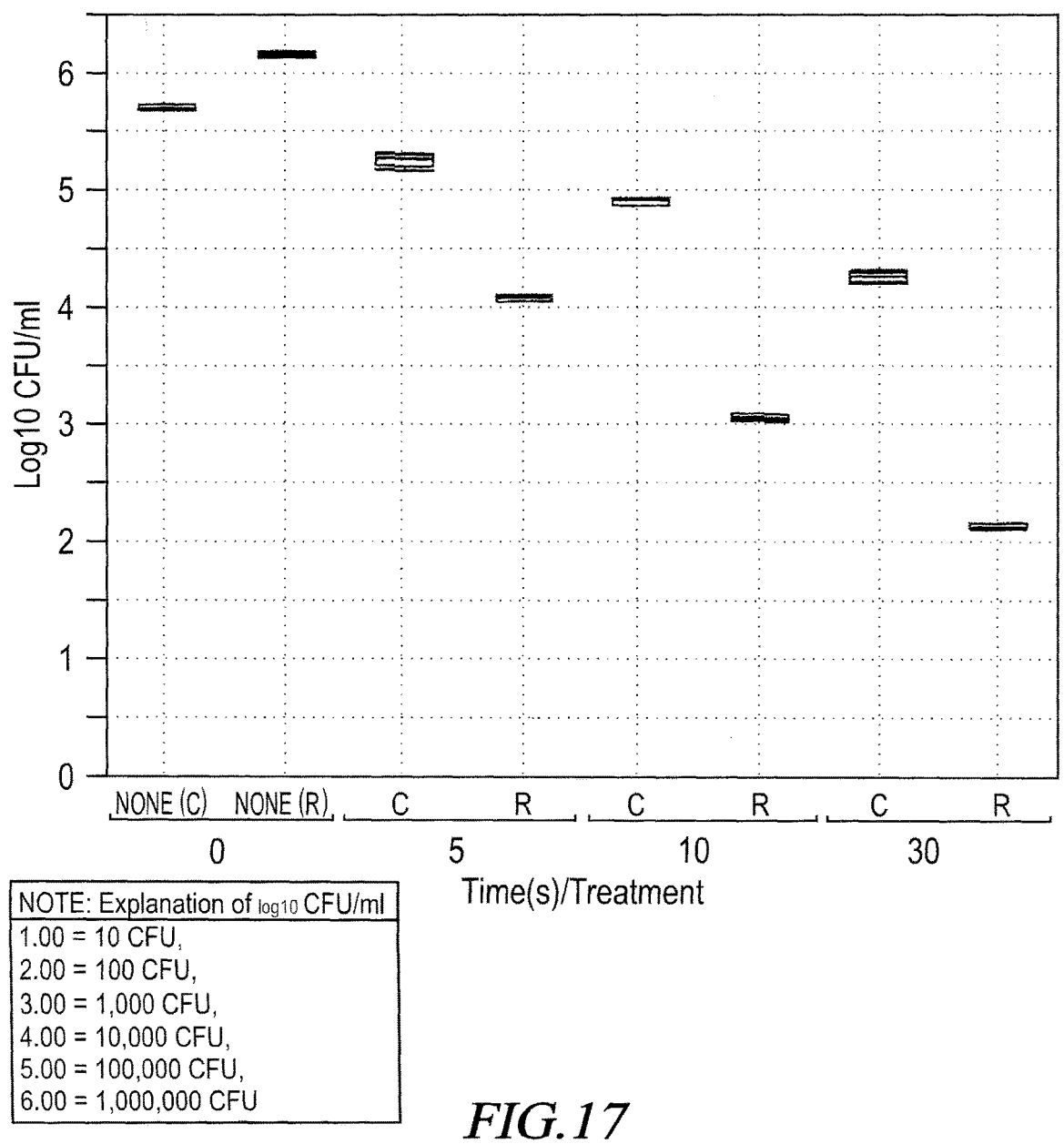
FIG. 17 shows a box plot indicating statistical variation in rinsing in a continuous flow well and in an elongated trough-like embodiment on utensils that were treated with 10% skim milk and *E. coli*.

Persistence of *E. coli* after 2 hours of use (i.e. treatment every 5 minutes) with the continuous flow system resulted in 0 and $0.19_{log\ 10}$ CFU/ml for DTW+*E. coli* and SM+*E. coli*, respectively. When compared to the results in FIG. 16 and FIG. 17 for rinse only and rinse+UV-C, the continuous flow system performed similarly to the dipper well apparatus for DTW+*E. coli*, but performed better than the dipper well apparatus for SM+*E. coli*.

The result of this study can be found in FIGS. 12-17.

CONCLUSIONS

1. Regardless of inoculum type (i.e. DTW vs. SM), rinse+UV-C removed more *E. coli* from the ice cream scoop than just the rinse alone (FIGS. 12 and 13).
2. Addition of the UV-C to the rinse over long-term use (2 hour period) appears to provide a protective barrier against the growth and/or persistence of bacteria on the utensil, especially in 10% skim milk media with *E. coli* (FIGS. 14 and 15).
3. Moreover, addition of the UV-C to the rinse over long-term use may play a protective role in preventing the persistence of *E. coli* in the dipper well apparatus basket, especially in 10% skim milk media with *E. coli*.
4. The dipper well apparatus was significantly better than the continuous flow system at removing *E. coli* inoculated in 10% skim milk media from the ice cream scoop (FIG. 16) at rinse times (FIG. 17).
5. For long-term use (2 hour period), the continuous flow system performed similarly to the dipper well apparatus for DTW K co/i, but performed better than the dipper well apparatus for SM+*E. coli*.

Sanitizers such as chemicals and detergents to precipitate dissolved solids also can be used, as well as thermo heated treatment of utensils. The heat treatment and choice of chemicals are determined by the type of material and the material's viscosity.

Example 2: Efficacy of Water Efficient Dipper Well Combined with Sanitizing Agents for Control of Microbial Growth Objective 1: Comparison of Sanitizers Combined with Water Conserving Dipper Well.

The dipper well apparatus combined with a sanitizing agent was evaluated for inactivation of microorganisms. Initially, a sterile utensil (e.g., ice cream scoop, stirring spoon, etc.) was immersed in dechlorinated tap water containing $10^6$ microorganisms (i.e. non-pathogenic *E. coli*) per ml. The utensil was then placed in the dipper well apparatus and subjected to an initial water rinse followed by application of a sanitizing agent either continuous UV (UV-C) or quaternary ammonium compound (QAC). The treated utensil along with the dipper well apparatus reservoir was swabbed in order to recover remaining microorganisms. The swab samples were then analyzed by standard culture methods (total aerobic plate count) to determine the efficacy of the combined dipper well apparatus and sanitizer in reducing the level of microorganisms.

Next, this method was repeated using utensils immersed in 10% skim milk medium (i.e. equivalent to fresh skim milk) containing $10^6$ microorganisms per ml. For each sanitizing agent, varying concentrations and exposure times was assessed to determine the most effective dose and exposure time for inactivation of microorganisms. FIG. 18 provides the treatment variables to be assessed for each sanitizing agent.

Objective 2: Assessment of Microbial Growth.

To demonstrate that the dipper well apparatus combined with sanitizer will control microbial growth over time, the dipper well apparatus will be continuously used over a 2-hour period as described above in Objective 1. In this instance, 'continuous' may be defined as utilization of the dipper welt apparatus once every 5 minutes for a total of 24 times. To inhibit growth of microorganisms inoculated in the 10% skim milk medium, the milk will be kept at 4° C. The utensil and dipper well apparatus will be swabbed for recovery of microorganisms at the end of the 2-hour period. Evaluations were repeated three times.

Measurement of Sanitizer Concentration.

The concentration of QAC during application was measured using QAC Quick Response Test Strips (Indigo® Instruments). To measure UV irradiance, a Germicidal UVC Light Meter will be used and equipped with a short wavelength (254 nm) sensor.

Total Aerobic Plate Count (TPC) Analysis.

Surfaces mentioned in Objectives 1 and 2 were swabbed using sterile calcium alginate tipped swabs presoaked in 0.1% buffered peptone water (BPW) and a 5×5 cm template for standardization of swab area. The swab was placed in 2 ml of BPW. The 2 ml sample was then be serially diluted and 1 ml of each dilution was plated in duplicate on 3M™ aerobic count Petrifilm™ at incubated for 24 hours at 37° C.

The results are reported in FIG. 18.

Sample Size

Objective 1

UV-C per exposure: 2 swabs*3 exposures*3 repeats*duplicate analyses*2 dilutions=72 samples QAC per exposure: 2 swabs*3 exposures*3 repeats*2 concentrations*duplicate analyses*2 dilutions=144 samples Control (water rinse): 2 swabs*3 repeats*duplicate analysis=12 samples, Objective 2

UV-C per exposure: 2 swabs*3 exposures*3 repeats*duplicate analyses*2 dilutions=72 samples QAC per exposure: 2 swabs*3 exposures*3 repeats*2 concentrations*duplicate analyses*2 dilutions=144 samples Control (water rinse): 2 swabs*3 repeats*duplicate analysis=12 samples The terms and expressions that have been employed are used as terms of description and not of limitation, and there is no intention in the use of such terms and expressions of excluding any equivalents of the features shown and described or portions thereof, but it is recognized that various modifications are possible within the scope of the present disclosure claimed. Thus, it should be understood that although the present disclosure has been specifically disclosed by preferred embodiments and optional features, modification and variation of the concepts, herein disclosed, may be resorted to by those skilled in the art, and that such modifications and variations are considered to be within the scope of the disclosure, as defined by the appended claims. Thus, additional embodiments are within the scope of the disclosure and within the following claims.

In general the terms and phrases used herein have their art—recognized meaning, which can be found by reference to standard texts, journal references and contexts known to those skilled in the art. The preceding definitions are provided to clarify their specific use in the context of the disclosure.

All patents and publications mentioned in the specification are indicative of the levels of skill of those skilled in the art to which the disclosure pertains. All references cited herein are hereby incorporated by reference to the extent that there is no inconsistency with the disclosure of this specification.

Insofar as the description above and the accompanying drawings disclose any additional subject matter that is not within the scope of the claims, the disclosures are not dedicated to the public, and the right to file one or more applications to claim such additional disclosures is reserved.

The invention claimed is:

1. An apparatus for use with a water source for cleaning utensils, comprising:
   a primary vessel defining an open top dipping aperture above a soaking level, the primary vessel comprising a drain having a recirculation outlet and a drainage opening;
   a secondary vessel insertable within said primary vessel essentially raising the drain opening level to above the soaking level, said secondary vessel defining at least one aperture above said soaking level, said aperture flowably connected to the drain;
   a water source flow path;
   a valve controlling the flow of the water source;
   a recirculation water flow path connecting a water source inlet with said recirculation outlet, said flow path further comprising a water pump, a turbidity sensor sensing the turbidity of water exiting said recirculation outlet;
   a controller controlling the opening and closing of said water source valve, and controlling the starting and stopping of the pump;
   a water level sensor for sensing the water level within the vessel at the soaking level and signaling said controller; and
   wherein activation of said controller signals said water source valve to open and water to flow from a fresh water inlet until filling said vessel to said soaking level, whereupon said water level sensor signals said controller to activate said pump to pump water through said recirculation flow path and exit said outlet; and
   wherein, when said turbidity sensor senses the turbidity of recirculation water above a predetermined first threshold, said turbidity sensor signals said controller to control said water source valve causing said water level to increase and overflow until said turbidity sensor senses the turbidity of recirculation water is below a predetermined second threshold.

2. The apparatus of claim 1, said controller having programming sufficient to control each identified functionality.

3. The apparatus of claim 2, said water level sensor configured to actuate controller programming enabling fresh water flow through said inlet for a predetermined volume.

4. The apparatus of claim 2, said water level sensor configured to actuate controller programming enabling fresh water flow through said inlet until a sensor signals the detection of the presence of water at the soaking level.

5. The apparatus of claim 2, said water source flow path further comprising a source water pressure regulator decreasing the pressure of source water.

6. The apparatus of claim 5, said water source flow path further comprising a flow meter regulated by said controller.

7. The apparatus of claim 2, said recirculation flow path further comprising a check valve preventing the flow of water into said outlet.

8. The apparatus of claim 2, said recirculation water flow path further comprising a sanitizing dispenser for dispensing sanitizing agent for sanitizing said utensils, said sanitizing agent selected from the group consisting of ozone, UV irradiation, heat, and chemical disinfectants, and combinations and mixtures thereof.

9. The apparatus of claim 8, said sanitizing dispenser comprising an ozone generator functionally coupled to a venture valve along said recirculation path or along said fresh water path, or both, and controlled by said controller.

10. The apparatus of claim 8, said sanitizing dispenser comprising a source of UV irradiation functionally coupled to an access valve along said recirculation path or along said fresh water path, or both and controlled by said controller.

11. The apparatus of claim 8, said sanitizing dispenser comprising a source of heat functionally coupled to an access valve along said recirculation path or along said fresh water path, or both and controlled by said controller.

12. The apparatus of claim 8, said sanitizing dispenser comprising a source of chemical disinfectant(s) functionally coupled to an access valve along said recirculation path or along said fresh water path, or both and controlled by said controller.

13. The apparatus of claim 2, further comprising a plurality of utensil holders for holding utensils within the water recirculating within the primary vessel without materially impeding contact by such water.

* * * * *